United States Patent
Bugg

[15] 3,653,340
[45] Apr. 4, 1972

[54] ROTARY TABLE
[72] Inventor: Charles H. Bugg, Mount Clemens, Mich.
[73] Assignee: Machine Products Corporation, Detroit, Mich.
[22] Filed: July 1, 1970
[21] Appl. No.: 51,598

[52] U.S. Cl. .............................. 108/139, 108/103, 248/425
[51] Int. Cl. ........................................................ A47b 11/00
[58] Field of Search .................. 108/139, 103, 104; 248/415, 248/425

[56] References Cited

UNITED STATES PATENTS

| 875,494 | 12/1907 | Bedell | 108/139 X |
| 3,063,714 | 11/1962 | Krauss | 108/139 X |

FOREIGN PATENTS OR APPLICATIONS 1,011,884  12/1965  Great Britain ........................ 108/139

Primary Examiner—James C. Mitchell
Attorney—Harness, Dickey & Pierce

[57] ABSTRACT

A free-wheeling rotary table comprising a base member, a horizontally disposed rotatable table member adapted to support an object for rotation about a generally vertical rotational axis, antifriction bearing means on one of the members arranged generally coaxially of the rotational axis, and a bearing surface on the other of the members engageable with the bearing means and defined at least in part by an imaginary sphere having its center located along the rotational axis of the table member.

8 Claims, 4 Drawing Figures

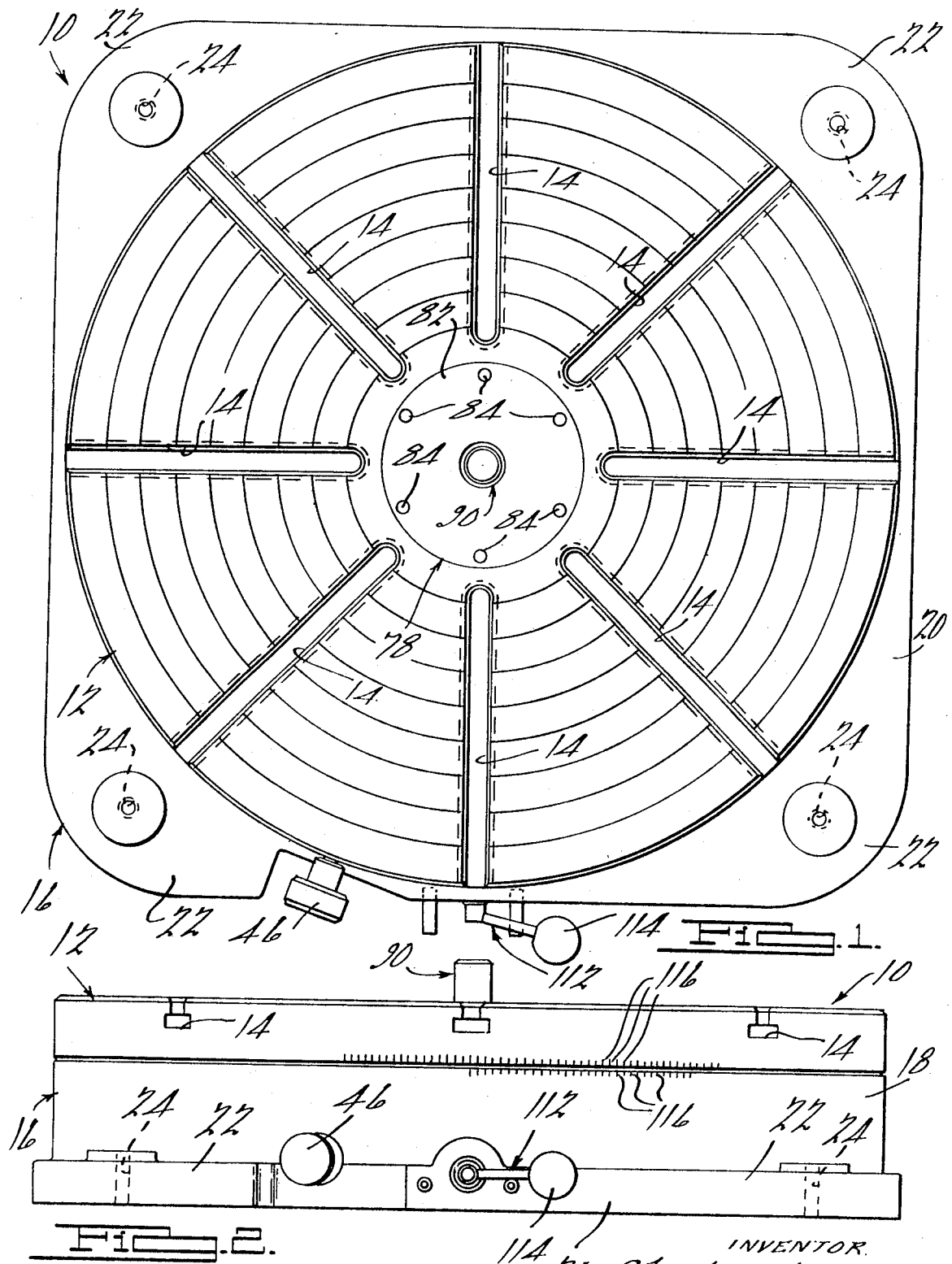

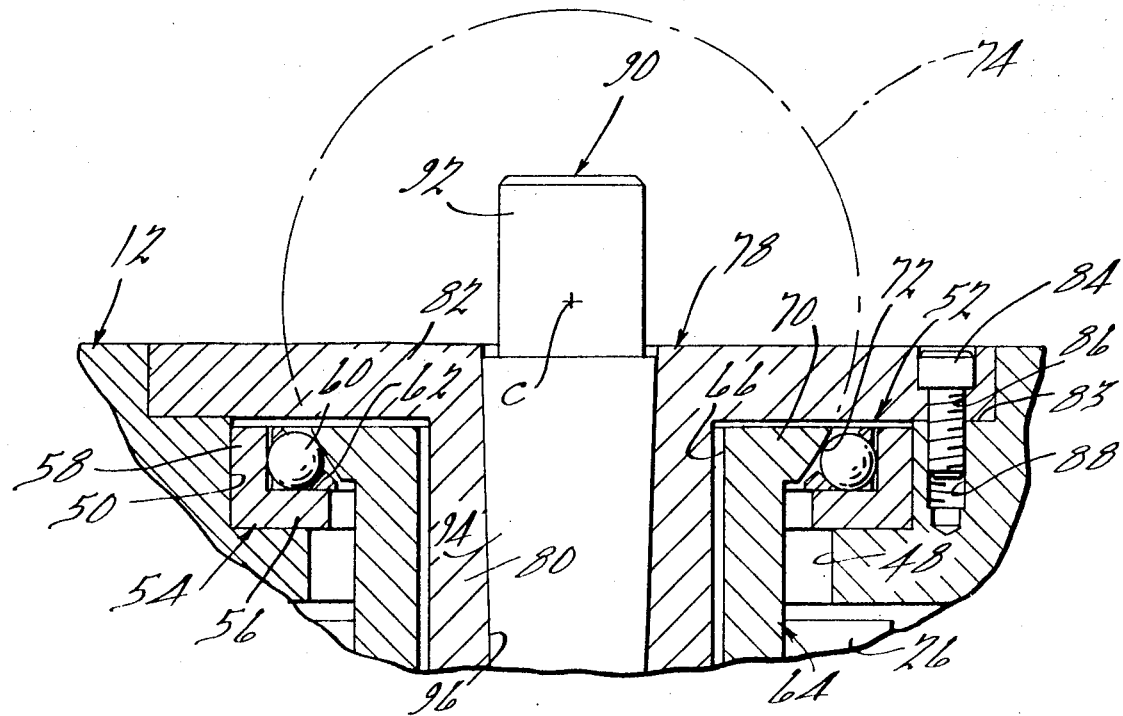
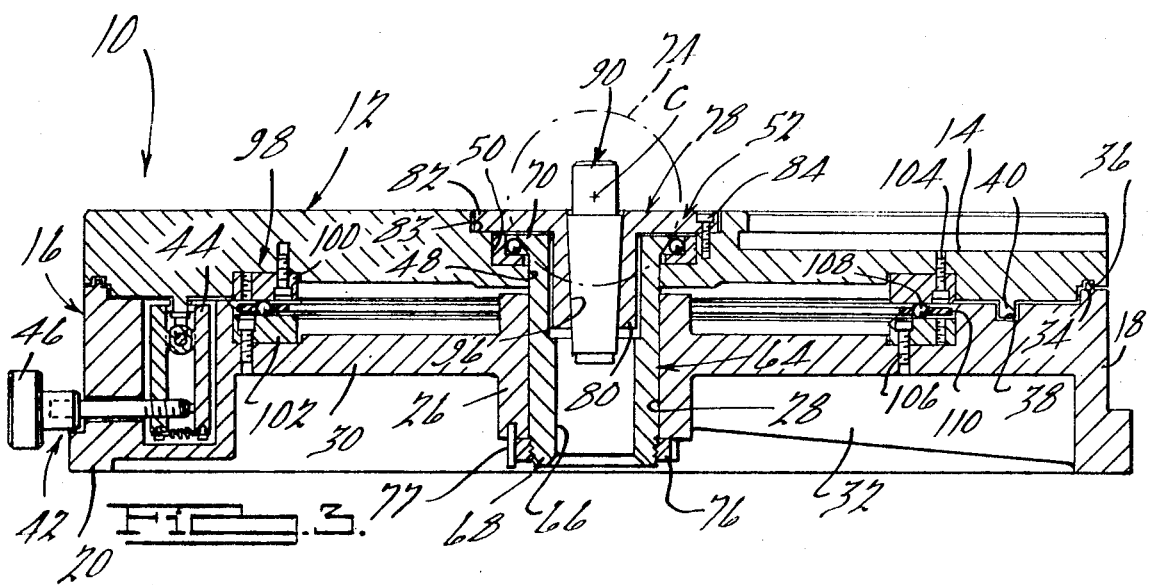

ROTARY TABLE

SUMMARY OF THE INVENTION

The present invention relates generally to free-wheeling rotary tables of the type adapted to rotatably support an object, such as a workpiece or the like which is to have a manufacturing operation performed thereon. Such operations typically consist of various inspection, machining and/or assembly procedures which are performed in connection with the production of precision objects and equipment. More particularly, the present invention is directed toward a new and improved free-wheeling rotary table that utilizes a novel bearing structure which minimizes axial runout and provides for extremely accurate concentricity without the need for any precision, and thus expensive, bearing assemblies and miscellaneous bearing keepers that have been required in similar type free-wheeling rotary tables known in the prior art. The aforementioned bearing structure generally comprises an antifriction bearing assembly consisting of a plurality of ball bearing elements arranged coaxially of the rotational axis of the table and operatively engageable with a bearing surface which is defined in part by a segment of imaginary sphere, the center of which lies along the rotational axis of the table. By virtue of the particular configuration of the bearing surface, accurate concentricity of rotation is achieved so that extremely accurate manufacturing and inspection operations may be performed upon the objects, i.e., workpiece or the like, operatively disposed upon the rotatable table member. Additionally, the particular design of the aforementioned bearing structure assures that the table is sufficiently rugged, yet compact so that it may be relatively easily handled and transported, yet will have a long and effective service life.

It is accordingly a general object of the present invention to provide a new and improved free-wheeling rotary table.

It is a more particular object of the present invention to provide a new and improved rotary table of the above described type which optimizes parallelism and concentricity and minimizes axial runout.

It is a further object of the present invention to provide a new and improved free-wheeling rotary table which obviates the need for precision and expensive bearing assemblies heretofore required in similar type rotary tables.

It is yet another object of the present invention to provide a new and improved rotary table which is of relatively simple design, is economical to manufacture, and easy to assemble.

Other objects and advantages of the present invention will become apparent from the following detailed description taken in conjunction with the accompanying drawings.

BRIEF DESCRIPTION OF THE DRAWINGS

FIG. 1 is a top elevational view of a rotary table embodying the principles of the present invention;

FIG. 2 is a side elevational view of the rotary table illustrated in FIG. 1;

FIG. 3 is a transverse cross-sectional view of the rotary table illustrated in FIGS. 1 and 2; and FIG. 4 is an enlarged fragmentary view of a portion of the rotary table illustrated in FIG. 3.

DETAILED DESCRIPTION OF THE PREFERRED EMBODIMENT

Referring now in detail to the drawings and in particular to FIGS. 1 and 2, a free-wheeling horizontal rotary table 10, in accordance with an exemplary embodiment of the present invention, is shown as generally comprising an annular or circular, generally horizontally disposed support platform or table member 12 which is formed with a plurality of radially disposed, upwardly exposed inverted T-shaped slots 14. The slots 14 are adapted to receive suitable screws, bolts, mounting brackets or the like for detachably securing an object, such as a workpiece or the like, to the upper side of the table member 12 in a manner well known in the art. The table member 12 is operatively supported upon a table support or base member, generally designated 16, which comprises a generally vertically disposed annular side wall section 18 that extends downwardly below the outer marginal edge of the table member 12, as best seen in FIG. 3. The side wall section 18 terminates at an integral lower support portion 20 which, as seen in FIG. 1, is of a generally square configuration and comprises four outwardly projecting mounting flange portions 22 that are formed with suitable threaded bores or the like 24 for receiving mounting screws, bolts or the like which function to secure the base member 16, and hence the entire table 10, to a suitable support structure or the like (not shown). As will hereinafter be described in detail, the table member 12 is adapted to be operatively supported upon the base member 16 in a manner such that the member 12 is free-wheeling, i.e., is freely manually rotatable, whereby objects or workpieces supported on the upper surface of the table member 12 may be rotated to various positions about a generally vertically oriented rotational axis in order to have various manufacturing operations, i.e., machining, inspection, etc., performed thereon.

As best illustrated in FIG. 3, the base member 16 is formed with a central, vertically disposed cylindrical support section 26 which defines a central cylindrical bore 28. The support section 26 is integrally connected to the side wall section 18 by means of a generally horizontally disposed intermediate section 30, the lower side of which may be provided with a plurality of integral reinforcing web portions 32, as illustrated. The upper side of the intermediate section 30 is formed with an upwardly extending annular land or projection 34 which projects upwardly into a complementary-shaped upwardly extending annular groove or recess 36 formed on the underside of the table member 12, the land 34 and groove 36 being out of contact with one another so as to be interference-free and functioning to prevent the ingress of any dirt or the like interiorly of the table 10 in a manner well known in the art. The upper side of the intermediate section 30 is also formed with an annular groove 38 spaced radially inwardly from the land 34 and adapted to have a downwardly projecting annular land 40 that is formed on the underside of the table 12 projecting interiorly thereof. The land 40 and groove 38 function similar to the aforementioned land and groove 34 and 36 and further cooperate with a locking assembly 42 which is adapted to lockingly secure the table member 12 in preselected rotational positions relative to the base member 16. The locking assembly 42 may be of any suitable construction well known in the art and may, for example, comprise a suitable brake element 44 that is movable toward and away from frictional engagement with the land 40 by means of a suitable control knob or the like 46 that is accessible on the exterior of the table 10, as illustrated.

The table member 12 is formed with a central annular opening 48 that is formed with a counterbore 50 within which an antifriction bearing assembly, generally designated 52, is mounted. The assembly 52 comprises an annular cup-shaped bearing member or race 54 that is fabricated of hardened steel and comprises a generally radially disposed lower section 56 and an integral axially upwardly extending section 58. The assembly 52 also comprises a plurality of ball-bearing elements, generally designated 60, which are arranged circumferentially around the bearing member 54 and disposed in contact with the upper side of the section 56 and radially inner side of the section 58 thereof. The bearing elements 60 are operatively retained upon the member 54 by means of a conventional bearing keeper or the like, herein designated by the numeral 62.

Extending axially through the opening 48 in the table member 12 is a generally cylindrically shaped hub member 64 which defines a central annular opening 66 and an exteriorly threaded lower end portion 68. The hub member 64 extends downwardly through the opening 28 in the central support section 26 of the base member 16, and the upper end thereof extends axially upwardly to a position in generally axial alignment with the counterbore 50. The upper end of the hub member 64 is formed with a radially outwardly extending shoulder, generally designated 70, which comprises a bearing race and defines a bearing surface 72 adapted for engagement with the bearing elements 60, as best seen in FIG. 4. In accordance with the principles of the present invention, the bearing surface 72 lies along a segment of an imaginary sphere, herein shown in phantom lines and designated by the numeral 74, and having its center lying along the rotational axis of the table member 12 and located slightly above the upper surface thereof, as indicated at point C in the drawings. The segmental spherical configuration of the surface 72 will be seen to optimize concentricity and parallelism of the table member 12, and at the same time, minimize axial runout without the need for any precision bearings as has heretofore been required in similar type precision rotary tables.

The lower threaded end 68 of the hub member 64 extends downwardly below the lower end of the support section 26 of the base member 16 and is adapted to threadably receive a suitable retaining ring or the like 76 which, when properly threadably advanced along the end portion 68, engages the lower side of the support section 26 to prevent relative axial movement between the hub member 64 and the base member 16 and assure positive engagement of the bearing surface 72 with the bearing element 60. A suitable locking pin or the like 77 may be provided to lockingly secure the retaining ring 76 in a preselected position, whereby to prevent inadvertent rotation thereof, as will be apparent.

Disposed within the upper end of the opening 66 is a generally cylindrically shaped mounting spindle 78 which comprises a central cylindrical body section 80 that extends downwardly within the upper end of the opening 66 and terminates at the upper end thereof at a generally radially outwardly extending flange portion 82. The flange portion 82 is nestingly received within an annular counterbore or recess 83 formed around the upper end of the counterbore 50 in a manner such that the upper surface of the flange portion 82 is flush, i.e., coplanar, with the upper surface of the table member 12. Means in the form of suitable screws, bolts or the like 84 are provided for fixedly securing the flange portion 82, and hence the spindle 78, to the table member 12, which screws 84 extend downwardly through counterbored openings 86 in the flange portion 82 and are threadably received within suitable axially and circumferentially aligned bores 88 in the table member 12.

In order to facilitate orientation of a workpiece or the like upon the table member 12, said member 12 may be provided with a central upwardly extending stub shaft 90, as illustrated in the drawings. The shaft 90 is shown as comprising a generally cylindrically shaped upper end portion 92 which extends upwardly from the upper surface of the table member 12 and is arranged coaxially of the rotational axis thereof. The shaft 90 also comprises a downwardly and radially inwardly tapered lower end portion 94 which is adapted to be received within a suitable complementary-shaped, i.e., tapered, bore 96 in the mounting spindle 78.

Disposed approximately midway between the rotational axis of the table member 12 and the outer periphery thereof is an outer bearing assembly, generally designated by the numeral 98. The assembly 98 comprises a pair of generally ring-shaped or annular upper and lower bearing plates 100 and 102, respectively, which are adapted to be fixedly secured to the underside of the plate member 12 and the upper side of the intermediate section 30 by means of suitable screws, bolts or the like 104 and 106, respectively. The bearing plates 100 and 102 are designed such that the confronting surfaces thereof lie in vertically spaced, parallel planes and interposed therebetween is a plurality of circumferentially spaced antifriction ball-bearing elements, generally designated by the numeral 108. The elements 108 are operatively retained at a position interjacent the bearing plates 100, 102 by means of a suitable bearing keeper 110, as will be apparent to those skilled in the art. The outer bearing assembly 98 functions to support the outer peripheral portion of the table member 12 when the same is subjected to extremely high loading, and it may be noted that in applications wherein high loading is not encountered, or wherein the objects to be supported upon the table member 12 have their weight concentrated about the center of the table 10, the outer bearing assembly 98 may be omitted without departing from the scope of the present invention.

If desired, the rotational table 10 of the present invention may be provided with a conventional slot pin assembly, herein designated by the numeral 112, which is conventionally provided with a locking pin or the like adapted to be moved into one of a series of circumferentially spaced bores provided in the underside of the table member 12 by means of a suitable control knob or the like 114 and thereby lockingly secure the table member 12 in a preselected rotational position. In order to assist the operator in selectively rotatably positioning the table member 12 with respect to the base member 16, the members 12, 16 may be provided with suitable locating indicia or the like 116, in a manner well known in the art.

While it will be apparent that the exemplary embodiment illustrated herein is well calculated to fulfill the objects above stated, it will be appreciated that the present invention is susceptible to modification, variation and change without departing from the scope of the invention.

What is claimed is:

1. A rotary workpiece support table comprising,
   an annular base member having a central section and an outer peripheral support surface engaging section,
   a horizontally disposed rotatable table member mounted on said base member and adapted to support an object for rotation about a generally vertical rotational axis,
   said table member comprising a central section generally vertically aligned with said central section of said base member and a generally flat radially outwardly disposed section extending radially outwardly to a position overlying said outer peripheral section of said base member,
   said central sections of said table member and said base member being formed with vertically aligned bores arranged coaxially of said rotational axis,
   a generally cylindrically shaped hub member extending through said bores,
   an antifriction bearing assembly for rotatably supporting said table member on said base member and comprising a first bearing race on said table member, a second bearing race on said hub member, and a plurality of antifriction ball bearing elements disposed between said first and second bearing races and lying along a common horizontally disposed plane,
   one of said bearing races being defined in part by a segment of an imaginary sphere having its center located on said axis of rotation and disposed above said horizontal plane, whereby to optimize concentricity and parallelism and minimize axial runout of said table member relative to said base member.

2. The combination as set forth in claim 1, which includes securing means engageable with the lower end of said hub member and adapted to exert an axially downwardly directed force thereagainst in order to positively engage said bearing elements with said bearing races.

3. The combination as set forth in claim 1 wherein said hub member is formed with a laterally outwardly directed shoulder at the upper end thereof, said shoulder comprising one of said bearing races and having a bearing surface on the lower side thereof defined by said sector of said imaginary sphere, the other of said bearing races being mounted on said table and being of a generally cup-shaped configuration and disposed below said shoulder for radially and axially confining said bearing elements.

4. The combination as set forth in claim 3 wherein said base member is formed with central sleeve section arranged coaxially of said rotational axis, wherein the lower end of said hub member extends downwardly through said sleeve section, and which includes a threadably mounted element on the lower end of said hub member adapted to be tightened against the lower end of said sleeve section for asserting an axially downwardly directed force against the hub member.

5. The invention as set forth in claim 1 wherein the upper end of said hub member includes a generally radially outwardly extending shoulder defining a bearing surface on the radially outer and lower portion thereof, said surface being defined by said segment of said imaginary sphere.

6. The invention as set forth in claim 1 wherein the upper end of said cylindrical bore in said table member is formed with a counterbore, and wherein said antifriction bearing means is disposed in part within said counterbore.

7. The invention as set forth in claim 1 which includes second antifriction bearing means spaced radially outwardly from said bearing assembly and interposed between the underside of said table member and the upper side of said base member.

8. The invention as set forth in claim 1 which includes spindle means on the upper end of said hub member for centrally locating an object on said table member.

* * * * *